Oct. 13, 1936.  H. D. MORGAN  2,057,341
ARTIFICIAL DENTURE AND METHOD OF MAKING THE SAME
Filed Oct. 2, 1934
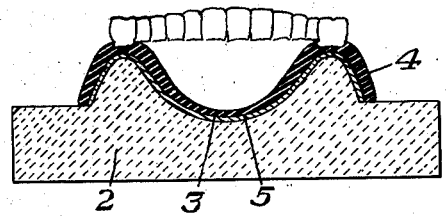
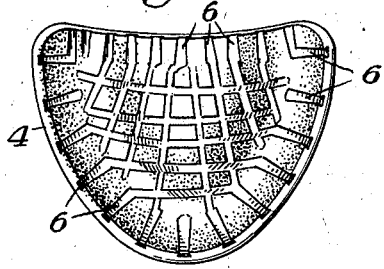
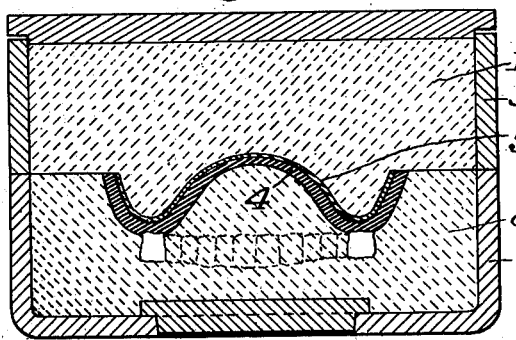
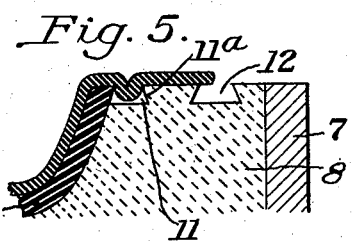
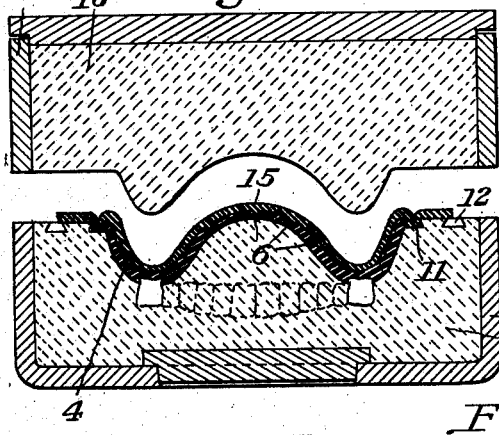
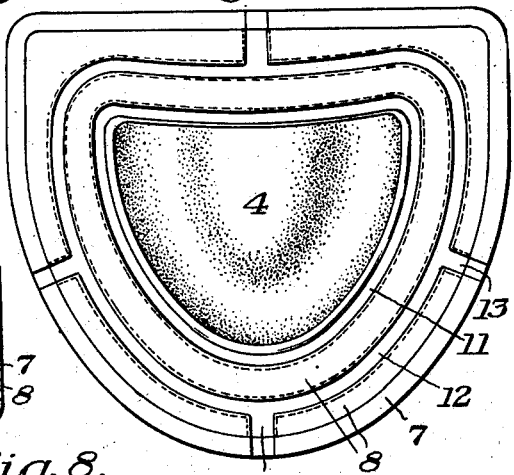
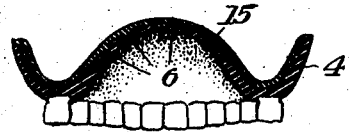
INVENTOR
Hugh D. Morgan
by his attorneys Patented Oct. 13, 1936

2,057,341

UNITED STATES PATENT OFFICE 2,057,341

ARTIFICIAL DENTURE AND METHOD OF MAKING THE SAME

Hugh D. Morgan, Youngstown, Ohio

Application October 2, 1934, Serial No. 746,526

4 Claims. (Cl. 32—2)

This invention relates to artificial dentures and their manufacture, and the present application constitutes a continuation-in-part of my earlier filed application, Serial No. 566,474, filed October 2, 1931. The invention, moreover, is an improvement on the invention disclosed in my copending application Serial No. 451,895, filed May 13, 1930.

In my said copending application Serial No. 451,895, I have disclosed a denture and the method of manufacturing the same, wherein the ordinary vulcanite denture is provided on its gum-engaging surface with a liner of a thermo-plastic rubber composition. This composition at body temperature holds its form, although it is elastic, but at temperatures slightly above body temperature it is deformable and can be molded. By reason of this arrangement, it is possible for the dentist to prepare the denture, apply the lining and then, by heating the lining slightly above body temperature, he can place the denture in the patient's mouth and have the patient bite, causing the thermo-plastic lining to flow to conform to the shape of the gums, and thereby insure an absolute fit. When the lining cools to body temperature, the rubber takes its permanent set and a denture with a lining molding in situ and of a resilient character is provided.

The thermo-plastic rubber lining is necessarily held in place by means of cement. It cannot be vulcanized into place because vulcanization would destroy its thermo-plastic properties and would also make the lining material more porous and impart an odor thereto. In the practice of the invention disclosed in the said copending application, difficulty has been encountered in securing in every denture satisfactory adhesion of the lining to the denture, and there is a tendency in some dentures for the whole lining to shift or slip. It is also difficult to secure an absolutely tight seal and sanitary condition around the margins of the denture where the lining material and the marginal edge of the plate are exposed to the fluids of the mouth. It is highly desirable that there be a very intimate contact of the lining and the plate around these edges.

According to the present invention, the construction and manipulation are such that the dentures can be produced regularly and commercially with assurance of good adhesion between the lining material and the plate itself. Not only is the present invention applicable to the manufacture of new dentures, but is also applicable to the repair of existing dentures.

The invention may be readily understood by reference to the accompanying drawing, in which Figure 1 represents a transverse section through a model showing a denture in the course of construction on the model;

Figure 2 is a top plan view of the vulcanite plate prior to the lining being put in place;

Figure 3 is a transverse sectional view through a dental flask illustrating a step in the preparation of the pressing member for applying the lining to the denture, the network of grooves not, however, being shown;

Figure 4 is a view similar to Figure 3 showing the dental flask separated and showing the lining material preliminarily shaped into position over the denture;

Figure 5 is an enlarged fragmentary view showing the marginal arrangement of the denture and its support;

Figure 6 is a top plan view of the lower part of the flask prior to the lining material being placed in the position shown in Figure 4, the view illustrating further the preparation of the assembly for securing the lining in place;

Figure 7 is a transverse section through a completed denture; and

Figure 8 is a detail view showing a stop burr used in the preparation of the denture for carrying out the present method.

In the drawing, I have illustrated the invention in connection with the manufacture of an upper denture, but it will be understood that the invention is equally applicable to the lower, the same procedure being followed in either case. While, therefore, only the upper is shown and described, it will be understood that the invention contemplates equally a lower denture.

In carrying out the invention, there is first prepared in accordance with the usual dental practice, a positive model in plaster of the patient's gums. This is made by first securing a negative impression and making from the negative a corresponding positive. In Figure 1, 2 designates the positive model. After the model has been prepared, a thin sheet of metal or of metal foil 3 is swedged or shaped over the outside of the model. The denture 4 is then built up over the outside of this filling layer 3. The result of this is that the denture 4 will have the gum-engaging surface 5 thereof oversized. In other words, if the denture were fitted into the mouth, or onto the stone model without the filling sheet 3 being employed, it would be loose and good adhesion would not be obtained. This looseness or clearance is provided for the purpose of accommodating the lining of thermo-plastic rubber material which is subsequently secured to the gum-engaging surface of the denture.

A suitable thermo-plastic material for this purpose is a mixture of natural dried latex or crepe rubber and ballata, the preparation being unvulcanized. Such a composition is formed into sheets. At body temperature, it is slightly elastic, and at temperatures somewhat above body temperature but low enough so that it can be molded when in contact with body tissues without burning the patient, the rubber is thermoplastic and can be molded and drifted under pressure.

After the denture has been made according to Figure 1, a number of recesses 6 are cut into the gum-engaging surface thereof, these recesses in some cases extending continuously across the denture and they form a network over substantially the entire area of the gum-engaging side of the denture. These recesses are preferably in the form of a dovetailed slot or groove. They are conveniently formed by the use of a burr, such as shown in Figure 8. This burr has a shank $a$, a stop portion $b$, and a downwardly flared cutting portion $c$. The burr is placed in a dental engine. The portion $c$ of the burr is brought into contact with the vulcanite plate for cutting the dovetailed slots, while the stop or shoulder $b$ limits the depth to which these slots can be cut. The slots around the margin of the denture preferably are cut from the edge downwardly into the valley which receives the gum. By manipulation of the burr, these slots are made wider at a point inwardly than they are at the outer edge. After the slots 6 have been formed in the denture 4, so that the entire surface of the denture is well covered with such slots forming a network as shown, the denture is embedded in a dental flask as shown in Figure 3. For the purpose of clearness, the network of grooves has not been shown in this figure. In this figure, 7 indicates the lower part of a flask having a mass of plaster or like cementitious material 8 therein in which the denture 4 is embedded. When the denture 4 has been embedded in the lower part of the flask, the filler plate 3 previously described in connection with Figure 1 is placed back on the gum-engaging surface. The upper section 9 of a dental flask is then put into place above the section 7, and plaster or other embedding material is cast into it, this mass of plaster being designated 10 in Figure 3, and it forms when it sets, a pressing surface for subsequently pressing the sheet of latex or thermo-plastic rubber onto the gum-engaging surface of the denture.

After the pressing surface has been formed, the operator cuts a small channel or groove 11 around the margin of the denture as shown in Figures 4, 5 and 6. The groove 11 preferably has an undercut side edge as indicated at 11a. It will be understood that the channel 11 is cut into the plaster of Paris 8 in the lower part of the flask and not in the denture itself. After the channel 11 has been cut about the margin of the denture, the operator cuts another channel 12 in the plaster, this channel being spaced outwardly from the channel 11. It is provided with one, and preferably a plurality of laterally extending ducts 13, which open through the side of the flask 7. When this procedure has been completed, the exposed surface of the denture 4 is thoroughly cleaned, benzene or gasoline preferably being used. After cleaning the vulcanite, a rubber cement is applied to the exposed surface of the denture. The filler plate 3, of course, will not be on the denture at this time. It is removed after the pressing plate 10 has been formed. When the cement on the denture is ready, a sheet of the thermo-plastic rubber material of a size considerably larger than the surface of the denture 4 and having approximately the contour of the channel 12 is heated to a desirable stage and it is applied over the surface of the denture as shown in Figure 4, the operator pressing the sheet of rubber onto the denture with his fingers and with the necessary implements, so that the sheet of 10 thermo-plastic rubber will conform generally to the denture and will be initially cemented in place thereon. Then the upper part of the flask 9 is placed in position over the assembly as shown in Figure 4, and the flask assembly is placed into a press or screw clamp and the two sections of the flask are squeezed together until the metal edges of the upper and lower sections of the flask are substantially in contact.

This squeezing together of the pressing plate 10 and the lower section of the flask causes the thermo-plastic rubber material first to be forced down into intimate contact with the denture and then to drift or flow laterally. By reason of the fact that the pressing plate 10 is molded while the metal filler plate 3 (see Figure 3) is in position on the denture, a clearance space is provided for a limited thickness of the thermoplastic rubber. Some of the rubber as it flows laterally outwardly completely fills the marginal groove or channel 11. The rest of the excess rubber is forced into the channel 12 and out the lateral passages 13. Of course, the rubber is also forced into the dovetailed channels or grooves 6.

When the assembly has cooled so that the lining sheet will have taken a permanent set, the flask is opened and the denture is taken out of the plaster 8. When the denture is removed from the plaster it will have a bead of rubber lining material around the marginal edge, formed by the displacement of the lining material into the marginal groove 11 during the forming operation. The operator then takes a knife and cuts off the bead and the denture is then substantially completed. In the completed denture comprising the vulcanite plate 4 and the layer of lining material 15, the lining material is interlocked to the vulcanite plate by reason of the dove-tailed grooves or recesses 6. The thickness of the lining 15 will be substantially the same as the thickness of the filler plate 3, being very slightly greater, due to the expansion of the rubber after the denture is relieved from compression in the flask.

An important step in the present invention is the formation of the marginal groove 11 around the embedded denture into which excess lining material is forced during the step of pressing the lining material onto the denture. The principle of this is that when rubber flows laterally over the marginal edge of the denture, it tends to wipe away the cement at the marginal edge. By providing the groove 11, this groove fills up with plastic rubber during the initial stages of pressing, and the creeping of the rubber off the marginal edge does not occur in such way as to wipe away the cement, and a counter-pressure is set up which resists any such creeping of the rubber. Consequently, when the rubber bead which is formed, is subsequently cut off, it is found that there is a very good adhesion around the margin of the denture between the lining and the vulcanite plate. This close adhesion can be consistently secured in every denture where the groove 11 is provided, whereas good adhesion could not always be predicted with previous methods of pressing the lining onto the denture.

When the denture has been thus finished, it is again warmed to a point where the lining becomes thermo-plastic. It is then placed in the patient's mouth and the patient applies a biting pressure, whereupon the thermo-plastic lining adjusts itself to the patient's gums under the pressure of mastication, and the final fitting is thus effected in situ. By having the slots 6 in the vulcanite plate taper toward the edge of the denture, the lining material in this final fitting does not tend to creep outwardly in the channel 6 the same as it has a tendency to do where the channels have straight sides.

In the denture thus provided, the lining is not only cemented in place, but it has an interlocking engagement by reason of the lining having been molded into the network of grooves 6. This interlock is not only at the edges, but also over substantially the entire area of the liner. It will, of course, be understood that instead of making regular grooves in the surface of the denture 4, the denture may be provided with upstanding projections or with a more irregularly roughened surface to form an effective interlock between the lining material and the rigid plate.

The lining is intended to form a permanent part of the denture, but it can be replaced after several years should this be necessary. If after the denture has been in use for some time, changes in the gums occur, the denture can be refitted by merely warming it to a point where the lining softens and then having the wearer bite on it again. Should it become desirable after the lining has been secured in place to increase the thickness of the lining, additional lining material, broken down to a liquid state, can be painted or otherwise put on and after drying will become an integral part of the lining.

While I have specifically described one method of carrying out my invention, it will be understood that various changes in the construction of different parts and in the exact manner of procedure may be made, as will be understood by those skilled in the art, according to particular conditions which may arise in connection with dentures of different shapes.

I claim:

1. An artificial denture comprising a rigid plate having a gum-receiving recess, said gum-receiving recess having a plurality of small undercut recesses therein distributed at intervals over the entire surface thereof, and a lining of a resilient thermo-plastic rubber which retains its shape at body temperature but which can be molded at a temperature slightly above body temperature, said lining having projections on one face thereof which are interlocked with the recesses on the plate.

2. The method of making an artificial denture, which comprises forming a denture with an oversized gum-receiving recess therein, embedding the denture in a cementitious body with the gum-engaging side thereof exposed, forming a rigid pressing surface, the contour of which conforms substantially to the contour of the gum-engaging surface but which is smaller whereby there is a clearance space between the denture and the pressing surface when the two are brought together, covering the denture with an adhesive cement, applying a thermo-plastic lining material in a softened condition over the adhesive-coated denture and of a thickness greater than the normal thickness of said clearance space, and pressing the lining material onto the plate with said pressing member and causing the excess to exude from between the denture and the pressing surface.

3. The method of making artificial dentures which comprises forming a denture with an oversized gum-receiving recess therein, embedding the denture in a cementitious body with the gum-engaging side of the denture exposed, forming a recess in the cementitious body around the marginal edges of the denture, covering the denture with adhesive, applying the thermo-plastic rubber lining to the denture, and pressing said lining with a form which conforms substantially to the gum-engaging surface of the denture but which is undersized relative to the denture, causing excess rubber to be squeezed into said recess, subsequently removing the denture from the cementitious mass, and thereafter removing the bead of lining material which was formed by the rubber entering said marginal recess.

4. The method of making dentures which comprises forming a denture with an oversized gum-engaging recess therein, applying an adhesive to the gum-engaging surface of the denture, applying a thermo-plastic rubber composition to the gum-engaging surface and pressing it into intimate contact with the adhesive-coated surface of the denture and in such manner as to form around the marginal edges of the denture a bead of the thermo-plastic lining material, and thereafter cutting away said bead.

HUGH D. MORGAN.